(12) United States Patent
Jagow et al.

(10) Patent No.: US 11,172,602 B2
(45) Date of Patent: Nov. 16, 2021

(54) BULK CONTAINER TO METER SEED TRANSFER

(71) Applicant: Bourgault Industries Ltd., St. Brieux (CA)

(72) Inventors: Scot Jagow, St. Brieux (CA); Ryan Cowan, St. Brieux (CA); Jami Rieder, St. Brieux (CA)

(73) Assignee: Bourgault Industries Ltd., St. Brieux (CA)

(*) Notice: Subject to any disclaimer, the term of this patent is extended or adjusted under 35 U.S.C. 154(b) by 226 days.

(21) Appl. No.: 16/437,065

(22) Filed: Jun. 11, 2019

(65) Prior Publication Data

US 2020/0000010 A1 Jan. 2, 2020

(30) Foreign Application Priority Data

Jun. 27, 2018 (CA) .................................. CA 3009543

(51) Int. Cl.
*A01C 7/08* (2006.01)
*A01C 5/06* (2006.01)
*A01C 7/04* (2006.01)

(52) U.S. Cl.
CPC .............. *A01C 7/082* (2013.01); *A01C 7/046* (2013.01); *A01C 5/062* (2013.01)

(58) Field of Classification Search
CPC ......... A01C 7/042; A01C 7/044; A01C 7/046; A01C 7/082
See application file for complete search history.

(56) References Cited

U.S. PATENT DOCUMENTS 5,379,706 A 1/1995 Gage et al.
5,915,312 A * 6/1999 Meyer .................... A01C 19/04
111/174

(Continued)

FOREIGN PATENT DOCUMENTS

CN 204119782 U 1/2015
DE 19917462 A1 10/2000

(Continued)

OTHER PUBLICATIONS

Canadian Office Action, and Examination Search Report, dated Jul. 9, 2019 for Application No. CA 3,009,543, 9 pgs.

(Continued)

*Primary Examiner* — Thomas B Will
*Assistant Examiner* — Ian A Normile
(74) *Attorney, Agent, or Firm* — Frost Brown Todd LLC; Nicole M. Tepe

(57) ABSTRACT

A seed supply system includes a singulating meter with a seed reservoir pressurized to a meter pressure that is in a desired pressure range. A seed supply air stream carries seeds dispensed from a nurse tank to an air release assembly located above the singulating meter. As seeds are metered from the seed reservoir at a rate less than the rate seeds are dispensed from the nurse tank seeds accumulate in the air release assembly. The pressure of the seed supply air stream at the top of the seed column fluctuates and a barrier is operative to resist air flow between the air release assembly and the seed reservoir sufficiently to maintain the meter pressure in the desired meter pressure range. The barrier can be provided for example by an airlock or a column of seed in a drop tube between the air release assembly and the seed reservoir.

4 Claims, 5 Drawing Sheets

(56) References Cited

U.S. PATENT DOCUMENTS

| | | | |
|---|---|---|---|
| 6,298,797 B1* | 10/2001 | Mayerle | A01C 7/102 |
| | | | 111/175 |
| 6,668,738 B2 | 12/2003 | Lee et al. | |
| 6,688,244 B1* | 2/2004 | Meyer | A01C 15/04 |
| | | | 111/174 |
| 7,086,342 B2 | 8/2006 | O'Neall et al. | |
| 7,373,890 B2 | 5/2008 | Kowalchuk | |
| 8,001,914 B2 | 8/2011 | Peterson et al. | |
| 8,375,874 B2 | 2/2013 | Peterson et al. | |
| 9,474,202 B2 | 10/2016 | Gilstring | |
| 9,936,627 B2 | 4/2018 | Wilhelmi et al. | |
| 2008/0295751 A1 | 12/2008 | Shoup et al. | |
| 2014/0020609 A1* | 1/2014 | Audigie | A01C 7/081 |
| | | | 111/14 |
| 2015/0296702 A1* | 10/2015 | Audigie | A01C 7/081 |
| | | | 222/637 |
| 2018/0139894 A1 | 5/2018 | Jagow et al. | |
| 2019/0346302 A1* | 11/2019 | Nedved | G01F 13/001 |

FOREIGN PATENT DOCUMENTS

| | | |
|---|---|---|
| DE | 10 2016 124737 A1 | 6/2018 |
| EP | 3 135 088 A1 | 3/2017 |
| EP | 3 335 535 A1 | 6/2018 |

OTHER PUBLICATIONS

European Search Report and Written Opinion dated Oct. 31, 2019 for Application No. EP 19181130.6, 13 pgs.

* cited by examiner

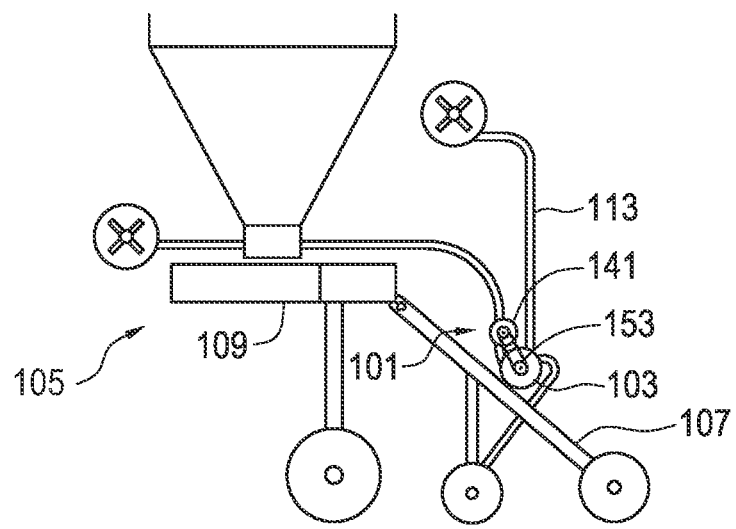
FIG. 6
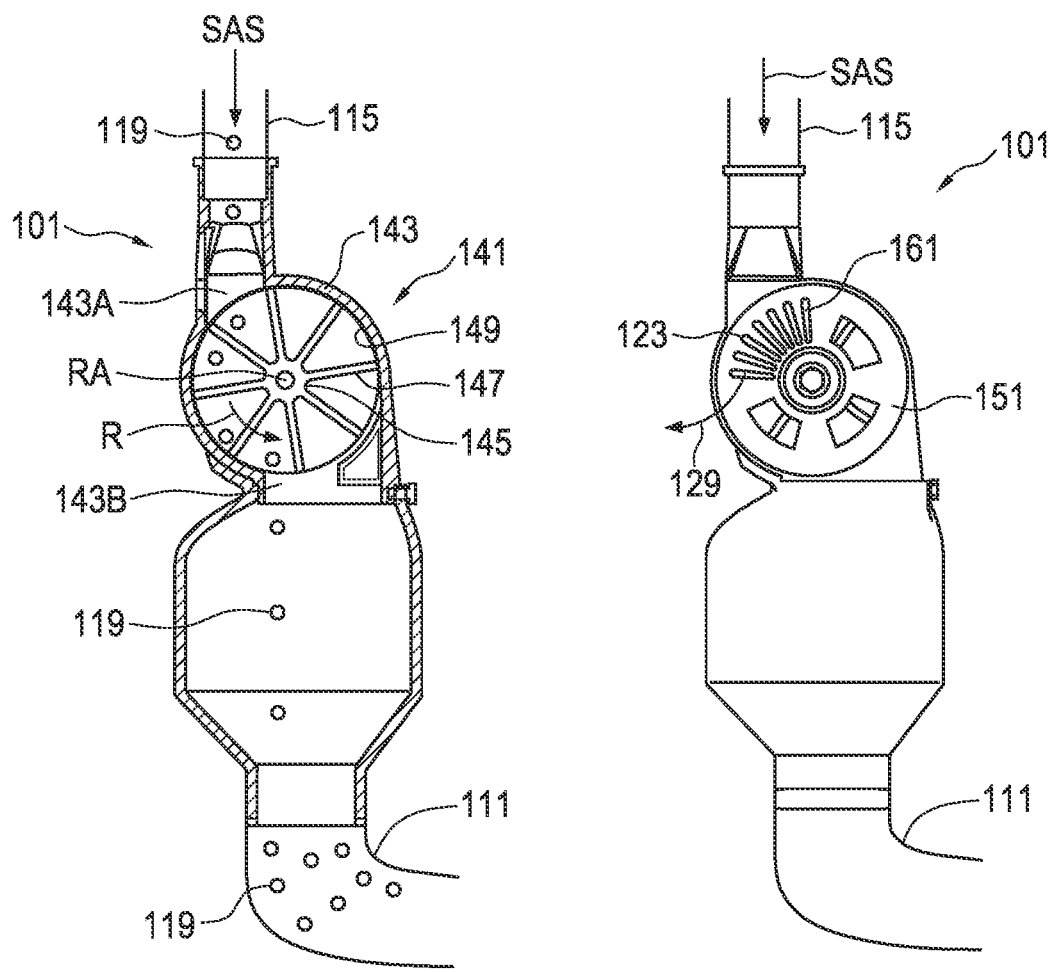
FIG. 7
FIG. 8

BULK CONTAINER TO METER SEED TRANSFER

CROSS-REFERENCE TO RELATED APPLICATION

This application claims priority to and benefit of CA Serial No. 3,009,543, filed Jun. 27, 2018, the contents of which are incorporated by reference in their entirety for all purposes.

FIELD OF THE INVENTION

This disclosure relates to the field of agricultural implements and in particular systems and methods for transferring seeds from a bulk container to a meter, such as a singulating meter.

BACKGROUND

For some agricultural crops such as corn it is desirable to plant the seeds equally spaced along furrows created in the soil by furrow openers such as discs or hoes. In seeding implements for such crops a singulating meter is typically provided for each furrow opener, and a seed container is mounted above each meter to supply seed to the meter by gravity. Typically such singulating meters have been mounted on the furrow opener itself, however United States Published Patent Application Number 20180139894 of Jagow et al. discloses an implement where the singulating meters are mounted on the implement frame.

Early planter designs required each seed container to be filled individually, a time consuming process. More recently centralized bulk fill systems have been developed where an air stream carries seeds from a single nurse tank to the seed container above each meter.

U.S. Pat. No. 9,936,627 to Wilhelmi et al. shows a singulating meter with a small seed reservoir built into the meter housing. A perforated seed disc rotates through the seed reservoir and seeds are picked up individually, one in each perforation, and held in the perforation by a difference in air pressure on each side of the seed disc. This pressure differential can be achieved in a positive pressure system by directing pressurized air into the reservoir to push the seeds into the perforations, as shown in U.S. Pat. No. 9,474,202 to Gilstring and U.S. Pat. No. 8,001,914 to Peterson et al., or in a negative pressure or vacuum system by drawing air out of the opposite side of the seed disc to create a vacuum which sucks the seeds into the perforations, as shown in U.S. Pat. No. 7,373,890 to Kowalchuk.

Seeds can be provided to the reservoir by gravity from a small hopper above the singulating meter as shown in U.S. Pat. No. 6,668,738 to Lee et al. where a supply conduit delivers seeds to each hopper as needed. In other systems, such as described in U.S. Pat. No. 8,001,914 to Peterson et al., a seed supply conduit connects the nurse tank directly to the reservoir on each singulating meter and an air stream through each seed supply conduit carries seeds from the nurse tank directly to each meter reservoir as needed.

U.S. Pat. No. 7,086,342 to O'Neal et al. describes an on-demand manifold such as would typically be mounted under the nurse tank to deliver seeds through the seed supply conduits to each singulating meter reservoir as needed, keeping a supply of seeds always available to be picked up by the seed discs.

In a typical positive pressure system there are two separate air streams. A seed supply air stream carries the seeds from the nurse tank to the meters, and a meter pressure air stream is directed into and pressurizes the seed reservoir. In the seeding implement of U.S. Pat. No. 8,001,914 to Peterson et al. the air stream from a single fan is divided into the two separate air streams, while in the implement of U.S. Pat. No. 9,474,202 to Gilstring there are two fans, one supplying the seed supply air stream and the other the meter pressure air stream.

In one common positive pressure system, such as shown in U.S. Pat. No. 8,375,874 to Peterson et al., the output end of the seed supply tube is connected to an air release assembly, such as an exhaust screen, upstream of the singulating meter so the air used to convey the bulk seed passes out through the screen and does not interfere with the air within the metering device. The air stream carries seeds through the seed supply conduit to the screen where the air escapes to the atmosphere and the seeds fall into the seed reservoir. When the level of seeds rises and blocks the exhaust screen the flow of air slows to a point where seed stops flowing through the seed supply conduit. As seeds are dispensed from the meter the level drops and the volume of the air stream increases as more of the screen is exposed, and builds to a point where seeds are again carried into the screened area.

In a different positive pressure system shown in the U.S. Pat. No. 9,474,202 to Gilstring, the output of the seed supply conduit is connected to a separator where the seeds are removed and the seed supply air stream is connected to the meter pressure air stream and directed into the seed reservoir. Gilstring cautions that to reduce turbulence, it is desirable for the pressurizing airflow and the separated airflow to have approximately equal pressure when they merge.

In a positive pressure meter the typical operating pressure of the meter is around 14 inches of water (3.5 kpa). A typical seed supply pressure may vary between 10" to 18" of water where the seed supply air stream enters the extractor of Gilstring, or the exhaust screen.

For satisfactory operation it is desirable to keep the meter pressure level in the seed reservoir substantially constant but the pressure level in the seed supply air stream needs only to be sufficient to carry the seeds through the seed supply conduits. Fluctuations in the pressure level in the seed supply air stream are common as more or less seed is being carried through the plurality of seed supply conduits from the nurse tank to the meter reservoirs. These pressure fluctuations are not harmful to the operation of the seed supply but can cause air to flow between the seed reservoir in the singulating meter and the seed supply conduit and cause pressure changes in the seed reservoir which can adversely affect the meter performance.

Problems arise due to crossover of air from one air stream to the other inside the seed reservoir. In a positive pressure system, the airflow pushes the seeds into the perforations and at an extraction point, somewhat above the level of seeds in the seed reservoir, the back side of the perforation is blocked and the seed is directed into an extractor tube and is carried to the furrow opener by meter air flowing through the extractor tube.

If the seed supply air pressure is higher than the meter pressure, air can flow from the seed supply conduit through the seeds blocking the screen then out through the screen to the atmosphere and also down into the seed reservoir, increasing the pressure in the seed reservoir to a level greater than the desired meter pressure level and increasing the volume of air flowing through the perforations in the seed disc and the extractor tube. This can cause more "doubles", where two seeds are present in one perforation, and can actually blow seeds from the seed reservoir directly into the extractor tube without being carried by the seed disc. Seed spacing uniformity can thus be adversely affected.

If the seed supply air pressure is lower than the meter pressure air can flow from the seed reservoir through the seeds in the screen to the atmosphere and also into the seed supply conduit, reducing the meter pressure level to a level less than the desired meter pressure level and decreasing the volume of air flowing through the perforations in the seed disc and the extractor tube, and reducing the force holding seeds in the perforations. Seeds can then fall out of the perforations before reaching the extractor tube causing "skips" where no seed is dispensed and again seed spacing uniformity is adversely affected. Where the meter pressure is significantly higher than the pressure in the seed supply conduit this flow into the seed supply conduit may retard or stop the flow of seed in the seed supply conduit all together.

SUMMARY OF THE INVENTION

The present disclosure provides a system and method for transferring seeds from a bulk container to a meter that overcome problems in the prior art.

In a first embodiment the present disclosure provides a seed supply system for a singulating meter. The system comprises a singulating meter mounted on a seeding implement, the singulating meter defining a seed reservoir. A meter pressure conduit is connected to the singulating meter and operative to direct a pressurized meter air stream into the seed reservoir at a meter pressure that is substantially in a desired meter pressure range. A seed supply conduit is connected at an input end of the seed supply conduit to an on-demand dispenser operative to dispense seeds from a nurse tank into a pressurized seed supply air stream flowing into the input end of the seed supply conduit, and an output end of the seed supply conduit is connected to an air release assembly located above the singulating meter. The on-demand dispenser is operative to dispense seeds from the nurse tank into the pressurized seed supply air stream flowing into the input end of the seed supply conduit only while a supply flow rate of the seed supply air stream is above a threshold supply flow rate. The seed supply air stream carries the seeds from the nurse tank to the air release assembly where air is released from the seed supply air stream through an exhaust vent and the seeds fall down into the seed reservoir. A metering rate of seeds metered from the seed reservoir is less than a dispensing rate of seeds dispensed from the nurse tank such that seeds accumulate in the seed supply conduit above the air release assembly and seeds fill the air release assembly such that the release of air from the seed supply air stream is resisted, and such that the supply flow rate of the seed supply air stream falls below the threshold supply flow rate and the on-demand dispenser stops dispensing seeds. As seeds are metered from the seed reservoir, the seeds move downward and out of the air release assembly and the resistance to the release of air from the seed supply air stream is reduced and the supply flow rate of the seed supply air stream rises above the threshold supply flow rate and seeds are dispensed from the on-demand dispenser. A supply pressure of the seed supply air stream at the output end of the seed supply conduit fluctuates between a maximum supply pressure that is above the meter pressure, and a minimum supply pressure that is below the meter pressure, and a barrier is operative to resist air flow between the air release assembly and the seed reservoir sufficiently to maintain the meter pressure in the desired meter pressure range.

In a second embodiment the present disclosure provides a method of transferring seeds from a nurse tank of a seeding implement to a seed reservoir formed in a singulating meter mounted on the seeding implement. The method comprises directing a pressurized meter air stream into the seed reservoir at a meter pressure that is substantially in a desired meter pressure range; dispensing seeds from the nurse tank into a pressurized seed supply air stream only while a supply flow rate of the seed supply air stream is above a threshold supply flow rate; directing the seed supply air stream through a seed supply conduit into an air release assembly mounted above the seed reservoir; at the air release assembly releasing air from the seed supply air stream such that the seeds fall down into the seed reservoir; metering seeds from the seed reservoir at a metering rate that is less than a dispensing rate of seeds dispensed from the nurse tank such that seeds gather in the seed supply conduit above the air release assembly and seeds fill the air release assembly such that the release of air from the seed supply air stream is resisted, and such that the supply flow rate of the seed supply air stream falls below the threshold supply flow rate and dispensing of seeds into the seed supply air stream stops; wherein as seeds are metered from the seed reservoir, the seeds move downward and out of the air release assembly and the resistance to the release of air from the seed supply air stream is reduced and the supply flow rate of the seed supply air stream rises above the threshold supply flow rate and dispensing seeds from the nurse tank into the seed supply air stream resumes; wherein a supply pressure of the seed supply air stream at the air release assembly fluctuates between a maximum supply pressure that is above the meter pressure, and a minimum supply pressure that is below the meter pressure; and resisting air flow between the air release assembly and the seed reservoir sufficiently to maintain the meter pressure in the desired meter pressure range.

The system and method of the present disclosure provide a column of seeds between the seed supply conduit and the seed reservoir that is configured such that the seed column resists air flow through the column sufficiently to maintain the meter pressure in a desired meter pressure range. Fluctuations in the meter pressure inside the seed reservoir of a singulating meter are reduced and consistency of the spacing of seeds metered by the singulating meter is improved.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 6 is a schematic side view of an alternate embodiment of the system of the present disclosure mounted on a seeding implement where the singulating meter is mounted on a furrow opener assembly;

FIG. 7 is a schematic cut-away side view of the airlock and air release assembly of the embodiment of FIG. 6;

FIG. 8 is a schematic side view of the airlock and air release assembly shown in FIG. 6 with the side panels defining screened openings;

DETAILED DESCRIPTION OF THE ILLUSTRATED EMBODIMENTS

Figure 1:
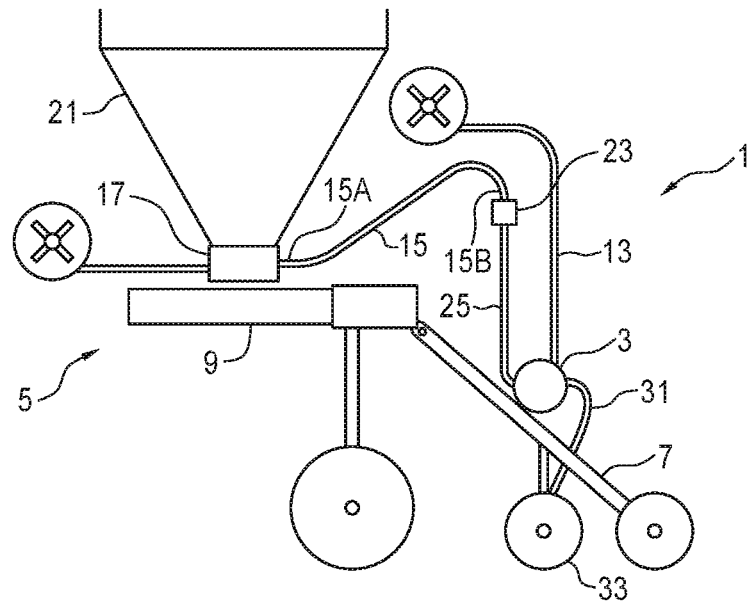
FIG. 1 is a schematic side view of an embodiment of the system of the present disclosure mounted on a seeding implement where the singulating meter is mounted on a furrow opener assembly.
Figure 2:
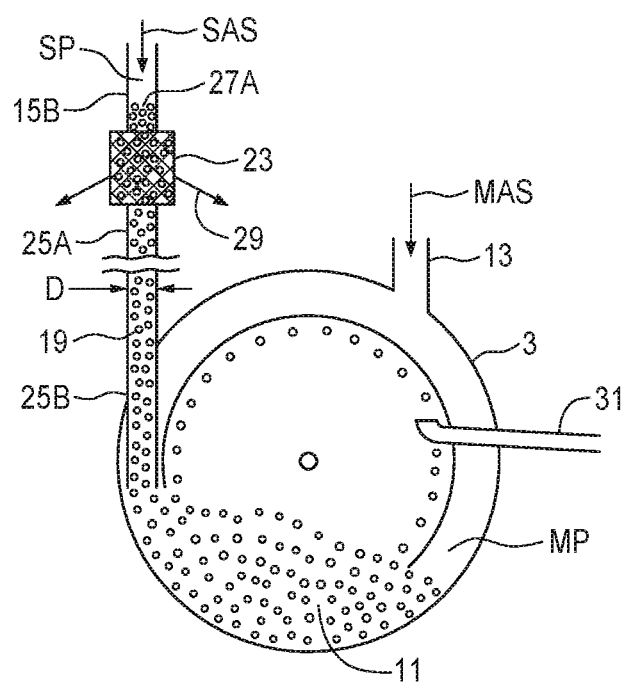
FIG. 2 is a schematic cut away side view of the singulating meter of the embodiment of FIG. 1 connected to the meter pressure conduit and to the drop tube, air release assembly, and seed supply conduit.

FIGS. 1 and 2 schematically illustrate an embodiment of a seed supply system 1 of the present disclosure for a singulating meter 3 mounted on a seeding implement 5. The seeding implement 5 comprises a furrow opener assembly 7 attached to an implement frame 9 of the seeding implement. Such furrow opener assemblies are commonly pivotally attached to the frame such that each furrow opener assembly 7 pivots up and down with respect to the implement frame 9 however other arrangements are known as well. In the seeding implement of FIG. 1 the singulating meter 3 is mounted on the furrow opener assembly 7.

The system 1 comprises the singulating meter 3 which defines a seed reservoir 11. A meter pressure conduit 13 is connected to the singulating meter 3 and is operative to direct a pressurized meter air stream MAS into the seed reservoir 11 at a meter pressure MP that is in a desired meter pressure range between a maximum meter pressure and a minimum meter pressure selected to provide satisfactory operation of the singulating meter 3. The singulating meter 3 dispenses seeds one at a time through a delivery conduit 31 to the furrow opener 33.

A seed supply conduit 15 is connected at an input end 15A thereof to an on-demand dispenser 17 operative to dispense seeds 19 from a nurse tank 21 into a pressurized seed supply air stream SAS flowing into the input end 15A of the seed supply conduit 15. An output end 15B of the seed supply conduit 15 is connected to an air release assembly 23 located above the singulating meter 3. In the drawings the meter air stream MAS and seed supply air stream SAS are created by separate fans however the air flow from a single fan could also be divided into the two required air streams as is known in the art.

The on-demand dispenser 17 is operative to dispense seeds 19 from the nurse tank 21 into the pressurized seed supply air stream SAS flowing into the input end 15A of the seed supply conduit 15 only while a supply flow rate of the seed supply air stream SAS is above a threshold supply flow rate. If the supply flow rate drops below the threshold supply flow rate, the dispenser 17 stops dispensing seeds.

The seed supply air stream SAS carries the seeds 19 from the nurse tank 21 to the air release assembly 23 which is configured to release air from the seed supply air stream SAS through an exhaust vent such as a screened opening. In the illustrated air release assembly 23 the released air is simply exhausted into the atmosphere but the released air may also be collected and directed into the meter air stream as described below. When the air is released the seeds 19 then fall down into the seed reservoir 11 by gravity.

Figure 3:
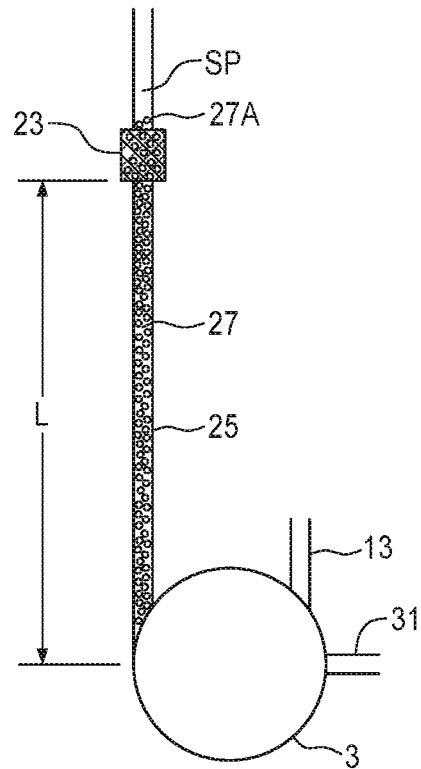
FIG. 3 is a schematic side view of the singulating meter of the embodiment of FIG. 1 connected to the meter pressure conduit and to the drop tube, air release assembly, and seed supply conduit and where the upper seed level of the seed column is above the air release assembly.
Figure 4:
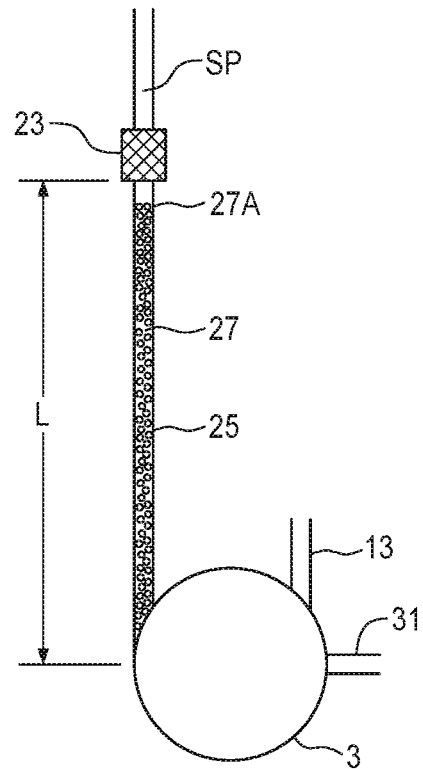
FIG. 4 is a schematic side view of the singulating meter of the embodiment of FIG. 1 connected to the meter pressure conduit and to the drop tube, air release assembly, and seed supply conduit and where the upper seed level of the seed column is below the air release assembly.
Figure 5:
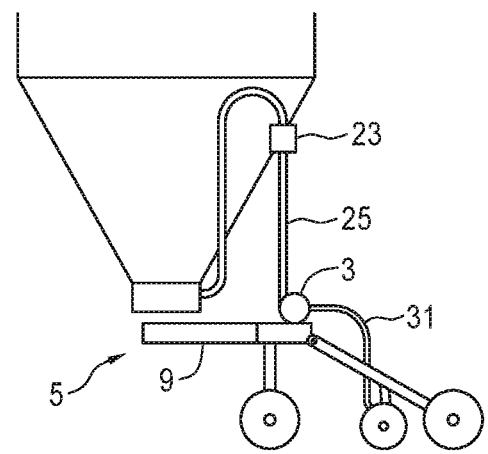
FIG. 5 is a schematic side view of the implement of FIG. 1 with an embodiment of the system of the present disclosure mounted on a seeding implement where the singulating meter is mounted on a frame of the seeding implement.

The metering rate of seeds 19 metered from the seed reservoir 11 is less than a dispensing rate of seeds 19 dispensed from the nurse tank 21 to ensure that seeds 19 are present in the seed reservoir 11 at all times during operation. Thus when the supply flow rate is above the threshold supply flow rate, seeds 19 flow into the seed reservoir 11 faster than they are metered out, and so seeds accumulate and a level of seeds rises above the air release assembly 23 and seeds 19 fill the air release assembly 23. As seeds 19 fill the air release assembly 23, they resist the release of air 29 from the seed supply conduit 15 through the air release assembly 23 and the supply flow rate falls and about when the air release assembly is full of seeds 19 as seen in FIG. 2 and FIG. 3, the supply flow rate of the seed supply air stream SAS falls below the threshold level and the dispenser 17 stops dispensing seeds, and seeds already in the seed supply conduit 15 drop out of the seed supply air stream SAS.

Then as seeds 19 continue to be metered from the seed reservoir 11 with no more seeds coming in from the seed supply conduit 15 the seeds move downward and out of the air release assembly 23 and the resistance to the release of air from the seed supply air stream is reduced and the supply flow rate of the seed supply air stream SAS rises above the threshold supply flow rate and seeds 19 are again dispensed from the on-demand dispenser 17 into the seed supply air stream SAS and seeds that fell out of the seed supply air stream are picked up and carried along the seed supply conduit 15.

When the air release assembly 23 is filled with seeds 19 the flow of air 29 out of the air release assembly 23 slows significantly due to increased resistance however a small flow still trickles through the seeds to the atmosphere. The supply pressure SP of the seed supply air stream SAS above the seed column 27 fluctuates between a maximum supply pressure that is above the meter pressure MP and a minimum supply pressure that is below the meter pressure MP. Since the air release assembly 23 provides a path to the atmosphere which is at a relatively low pressure compared to the meter pressure MP, air will also tend to flow up the drop tube 25 and out the air release assembly 23.

The present disclosure therefore provides a barrier operative to resist air flow between the air release assembly 23 and the seed reservoir 11 sufficiently to maintain the meter pressure MP in the desired meter pressure range.

In the embodiment of FIGS. 1-5 the barrier comprises a drop tube 25 connected at an upper input end 25A thereof to the air release assembly 23 and connected at a lower output end 25B thereof to the seed reservoir 11.

As the on-demand dispenser 17 dispenses seeds into the seed supply air stream SAS a seed column 27 of seeds 19 forms in the drop tube 25, and an upper level 27A of the seed column 27 rises to the air release assembly 23 and seeds 19 fill the air release assembly 23 the such that the supply flow rate of the seed supply air stream SAS falls below the threshold supply flow rate and the on-demand dispenser 17 stops dispensing seeds.

As seeds are metered from the seed reservoir 11 the seeds move downward and out of the air release assembly 23 and upper level 27A of the seed column 27 drops to a level such as shown in FIG. 4 where the resistance to the release of air from the seed supply air stream SAS is reduced and the supply flow rate of the seed supply air stream SAS rises above the threshold supply flow rate and seeds 19 are again dispensed from the on-demand dispenser 17 into the seed supply air stream SAS.

The barrier resisting air flow between the air release assembly 23 and the seed reservoir 11 is provided by the seed column 27 of seeds. The flow of air up and down the drop tube 25 between the air release assembly 23 and the seed reservoir 11 is resisted by the seeds 19 in the seed column 27. The length L and the diameter D of the drop tube 25 are selected such that the seed column 27 of seeds 19 resists air flow through the drop tube 25 sufficiently to maintain the meter pressure MP in the desired meter pressure range.

The drop tube 25 is oriented substantially vertically as it has been found for a given length of the seed column 27, air passes more easily through the seed column 27 when same is oriented any significant degree away from a vertical orientation.

Where the seeds are corn seeds, and where the desired range of the meter pressure MP is between about 13 and 15 inches of water, and the supply pressure SP fluctuates between a maximum supply pressure SP of about 26 inches of water and a minimum supply pressure SP of about zero inches of water, it has been found that a length L of the drop tube equal to about 27 inches, with a diameter D of 1.5 inches, is satisfactory to substantially maintain the meter pressure in the desired range. Trial and error testing can readily be performed to find a satisfactory column depth and drop tube length L for different situations and different seeds such as soybeans, sunflowers, canola or the like.

The substantially vertical orientation of the drop tube 25 has been found to provide the greatest resistance to air flow compared to a drop tube oriented at a significant angle away from vertical.

It has also been found that the diameter of the drop tube 25 will affect the amount of resistance to air flow provided by the seed column 27 and this can be adjusted along with the length L to provide the required resistance to air flow.

Operators of the seeding implement 5 can also readily check the functioning of the system 1 visually where the drop tube 25 is made from a transparent or translucent material such as plastic and the seed column 27 of seeds 19 is visible through the drop tube 25.

FIG. 5 schematically illustrates an alternate location for the singulating meter 3 mounting same on the frame 9 of the seeding implement 5 with the drop tube 25 extending up the required distance above the frame 9 to the air release assembly 23. In this arrangement many of the drop tubes 25 will be visible from the operator's location.

FIGS. 6-8 schematically illustrate an alternate embodiment of a seed supply system 101 of the present disclosure for a singulating meter 103 mounted on a seeding implement 105. The seeding implement 105 comprises a furrow opener assembly 107 attached to an implement frame 109 of the seeding implement. In the seeding implement of FIG. 6 the singulating meter 103 is mounted on the furrow opener assembly 107 and a meter pressure conduit 113 is connected to the seed reservoir 111 of the singulating meter 103.

In the system 101 the barrier is provided by an airlock 141 operative to allow seeds 119 to pass from the air release assembly 123 to the seed reservoir 111 while substantially preventing air movement between the air release assembly 123 and the seed reservoir 111 of the singulating meter 103. The system 101 comprises a cylindrical chamber 143 with an upper input opening 143A connected to the output end of the seed supply conduit, and a lower output opening 143B connected to the seed reservoir 111. A paddle wheel 145 is rotatable in the cylindrical chamber 143 about a rotational axis RA that coincides with an axis of the cylindrical chamber 143 such that edges of paddles 147 of the paddle wheel 145 are closely fitted to an inner wall 149 of the cylindrical chamber and to side panels 151 enclosing ends of the cylindrical chamber 143.

A wheel drive 153 rotates the paddle wheel about the rotational axis RA and the airlock 141 is provided by the paddles 147 of the paddle wheel 145. As the paddle wheel 145 rotates in direction R seeds are moved through the cylindrical chamber 143 from the input opening 143A thereof to the output opening 143B thereof and into the seed reservoir 111. Air passes through with the seeds however the air in the seed supply conduit 115 is isolated from the air in the seed reservoir 111 and differences in air pressures in the seed supply conduit 115 and the seed reservoir 111 cannot force air through the cylindrical chamber because of the sealed edges of the paddles 147 against the cylindrical chamber 143.

In a typical singulating meter 103 as schematically illustrated in FIG. 10A, a seed disc is rotated by a seed disc drive 155, and conveniently drive element 157, such as a belt or chain, can be connected to a pulley 159 on the paddle wheel to provide the wheel drive 153 to rotate the paddle wheel 145. Alternatively as shown in FIG. 10B the airlock assembly may be incorporated into the housing of the singulating meter 103 and the seed disc 104 may have gear teeth cut into its periphery that directly or indirectly drives a gear or set of gears that drive the paddle wheel 145.

The paddle wheel 145 can also be driven by a separate prime mover such as an electric motor or the like. The drive element for the paddle wheel drive can be appropriately geared such that the seed removed from the reservoir 111 will be equal to the seed replenished to the seed reservoir from the airlock assembly 141. Alternatively the drive element for the paddle wheel drive could be appropriately geared such that the airlock assembly always replenishes the seed to the seed reservoir at a rate higher than seed is removed and when the seed reservoir is full a clutch allows the paddle wheel to stop rotating until the seed in the reservoir starts to drop and needs replenishing. Where the paddle wheel is driven by a separate prime mover, the prime mover can be engaged and disengaged to maintain the seed in the reservoir at an appropriate level from feedback from a sensor 120 in the seed reservoir.

In the system 101 the air release assembly 123 comprises a plurality of screened openings 161 in the cylindrical chamber 143 under the upper input opening 143A. In the illustrated system 101 the screened openings 161 are defined in a side panel 151 of the cylindrical chamber 143. Air 129 is released from the seed supply air stream SAS through the screened openings 161. Air escapes from between the paddles 147 behind the panel 151 and the paddles below the openings 161 seal the cylindrical chamber and prevent air flow from the air release assembly 123 to seed reservoir 111. Seeds are carried down into the seed reservoir 111 by the rotating paddles 147 of the paddle wheel 145.

Figure 9:
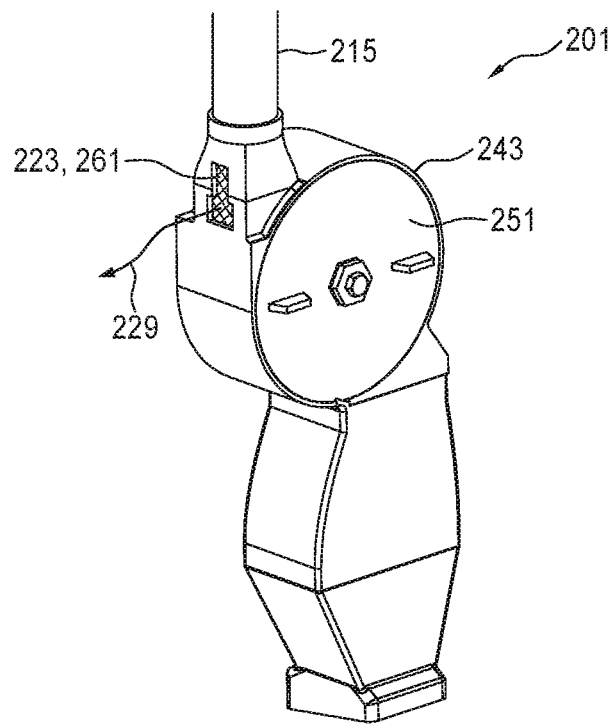
FIG. 9 is a schematic perspective view of the airlock and air release assembly of an alternate embodiment of the system of the present disclosure.
Figures 10A, 10B:
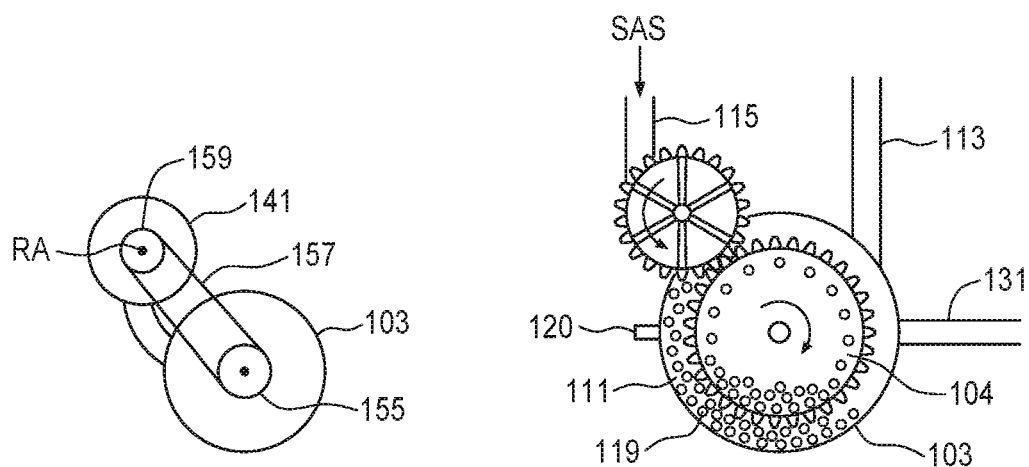
FIG. 10A is a schematic side view of a wheel drive for the paddle wheel of an air lock comprising a drive element connecting the paddle wheel to the rotating seed disc of the singulating meter.
FIG. 10B is a schematic side view of an alternative wheel drive for the paddle wheel of an air lock comprising a gear arrangement connecting the paddle wheel to the rotating seed disc of the singulating meter.

FIG. 9 schematically illustrates an alternate embodiment of the present system 201 where the side panels 251 of the cylindrical chamber 243 are solid and a screened opening 261 in the seed supply conduit 215 above the cylindrical chamber 243 provides the air release assembly 223.

Figure 11:
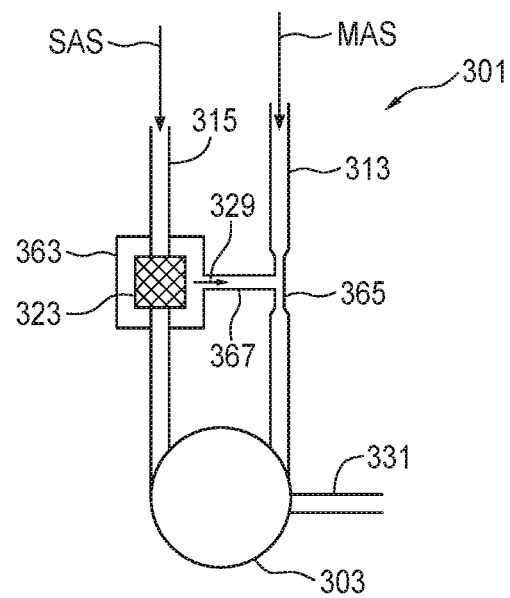
FIG. 11 is a schematic side view of an alternate embodiment of the system of the present disclosure where the air released from the seed supply air stream at the air release assembly is collected and drawn into the meter air stream and then directed into the ground.

Seeds often are coated with chemicals such as fungicides, herbicides, pesticides, or the like which can be hazardous to persons, animals, and insects in proximity to the operation of the singulating meters. FIG. 11 schematically illustrates an alternate system 301 that is similar to the system 1 in providing an air release assembly 323 above the singulating meter 303 however the system 301 captures the air 329 released from the seed supply air stream SAS at the air release assembly 323 and directs same into the meter air stream MAS. The air 329 thus passes into the singulating meter 303 and then is directed with the seeds metered from the singulating meter 303 through the delivery conduit 331 to the furrow opener and into a furrow in the ground.

In the system 301 an enclosure 363 surrounds the air release assembly 323 and the meter pressure conduit 313 includes a venturi tube 365. The enclosure 363 is connected by a tube 367 to the venturi tube 365. Air 329 that is released from the seed supply air stream SAS through the exhaust vent of the air release assembly 323 is collected in the enclosure 363 and the meter air stream MAS passing through the venturi tube 365 draws the air 329 out of the enclosure 363 and into the meter pressure conduit 313.

Figure 12:
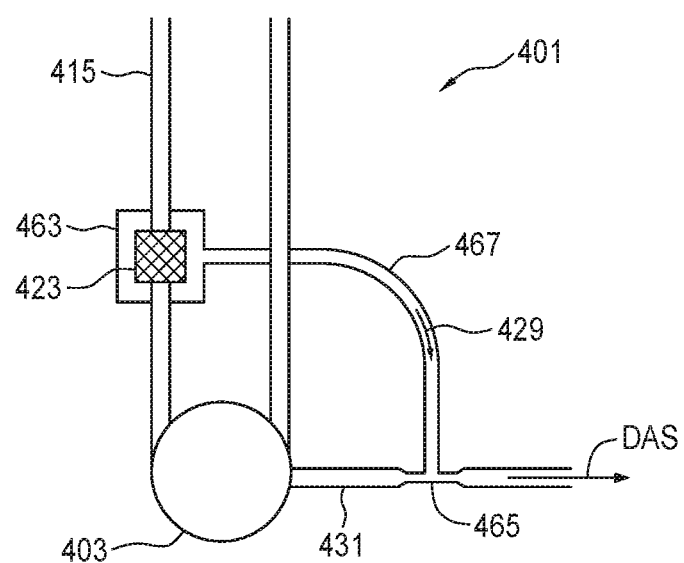
FIG. 12 is a schematic side view of an alternate embodiment of the system of the present disclosure where the air released from the seed supply air stream at the air release assembly is collected and drawn into the delivery air stream and then directed into the ground.

FIG. 12 schematically illustrates an alternative system 401 where an enclosure 463 surrounds the air release assembly 423 and the delivery conduit 431 connecting the singulating meter to the furrow opener includes a venturi tube 465. The enclosure 463 is connected by a tube 467 to the venturi tube 465. Air 429 that is released from the seed supply air stream SAS through the exhaust vent of the air release assembly 423 is collected in the enclosure 463 and the delivery air stream DAS passing through the venturi tube 465 draws the air 429 out of the enclosure 463 and into the delivery conduit 431. It is contemplated that the venturi 465 in the delivery conduit 431 may disturb the spacing of seeds passing through the delivery conduit 431, but this arrangement may be useful in some situations.

The present disclosure also provides a method of transferring seeds from a nurse tank 21 of a seeding implement 5, 105 to a seed reservoir 11, 111 formed in singulating meter 3, 103 mounted on the seeding implement. The method comprises directing a pressurized meter air stream MAS into the seed reservoir 11, 111 at a meter pressure that is substantially in a desired meter pressure range; dispensing seeds 19, 119 from the nurse tank into a pressurized seed supply air stream SAS only while a supply flow rate of the seed supply air stream is above a threshold supply flow rate; directing the seed supply air stream SAS through a seed supply conduit 15, 115 into an air release assembly 23, 123, 223 mounted above the seed reservoir 11, 111; at the air release assembly 23, 123, 223 releasing air 29, 129, 229 from the seed supply air stream SAS such that the seeds 19, 119 fall down into the seed reservoir 11, 111; metering seeds from the seed reservoir 11, 111 at a metering rate that is less than a dispensing rate of seeds dispensed from the nurse tank 21 such that seeds gather in the seed supply conduit 15, 115 above the air release assembly 23, 123, 223 and seeds fill the air release assembly such that the release of air from the seed supply air stream SAS is resisted, and such that the supply flow rate of the seed supply air stream SAS falls below the threshold supply flow rate and dispensing of seeds into the seed supply air stream stops; wherein as seeds are metered from the seed reservoir, the seeds move downward and out of the air release assembly 23, 123, 223 and the resistance to the release of air from the seed supply air stream SAS is reduced and the supply flow rate of the seed supply air stream rises above the threshold supply flow rate and dispensing seeds from the nurse tank 21 into the seed supply air stream SAS resumes; wherein a supply pressure of the seed supply air stream SAS at the air release assembly fluctuates between a maximum supply pressure that is above the meter pressure, and a minimum supply pressure that is below the meter pressure; and resisting air flow between the air release assembly 23, 123, 223 and the seed reservoir 11, 111 sufficiently to maintain the meter pressure in the desired meter pressure range.

The present disclosure reduces fluctuations in the meter pressure inside the seed reservoir of a singulating meter and improves performance of the singulating meter.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of transferring seeds from a nurse tank of a seeding implement to a seed reservoir formed in singulating meter mounted on the seeding implement, the method comprising:

directing a pressurized meter air stream into the seed reservoir at a meter pressure that is substantially in a desired meter pressure range;

dispensing seeds from the nurse tank into a pressurized seed supply air stream only while a supply flow rate of the seed supply air stream is above a threshold supply flow rate;

directing the seed supply air stream through a seed supply conduit into an air release assembly mounted above the seed reservoir;

at the air release assembly releasing air from the seed supply air stream into the atmosphere such that the seeds fall down into the seed reservoir;

metering seeds from the seed reservoir at a metering rate that is less than a dispensing rate of seeds dispensed from the nurse tank such that seeds gather in the seed supply conduit above the air release assembly and seeds fill the air release assembly such that the release of air from the seed supply air stream is resisted, and such that the supply flow rate of the seed supply air stream falls below the threshold supply flow rate and dispensing of seeds into the seed supply air stream stops;

wherein as seeds are metered from the seed reservoir, the seeds move downward and out of the air release assembly and the resistance to the release of air from the seed supply air stream is reduced and the supply flow rate of the seed supply air stream rises above the threshold supply flow rate and dispensing seeds from the nurse tank into the seed supply air stream resumes;

wherein a supply pressure of the seed supply air stream at the air release assembly fluctuates between a maximum supply pressure that is above the meter pressure, and a minimum supply pressure that is below the meter pressure;

connecting a drop tube at an upper input end of the drop tube to the air release assembly and connecting the drop tube at a lower output end of the drop tube to the seed reservoir;

wherein as seeds are dispensed into the seed supply air stream a seed column of seeds forms in the drop tube, and an upper level of the seed column rises into the air release assembly and seeds fill the air release assembly;

wherein as seeds are metered from the seed reservoir the upper level of the seed column drops below the air release assembly; and configuring the drop tube to have a length of at least 38 centimeters (15 inches) such that the seed column of seeds resists air flow through the drop tube sufficiently to maintain the meter pressure in the desired meter pressure range.

2. The method of claim 1 comprising selecting the drop tube to have a diameter between about 2.5 to 5.0 centimeters (1 to 2 inches).

3. The method of claim 1 comprising orienting the drop tube within about ten degrees of vertical.

4. The method of claim 1 comprising pivotally attaching a furrow opener assembly to an implement frame of the seeding implement, and mounting the singulating meter on the implement frame and connecting the singulating meter to the furrow opener, and forming the drop tube from a material selected such that the seed column of seeds is visible through the drop tube.

* * * * *